US005315316A

United States Patent [19]

Khormaee

[11] Patent Number: 5,315,316

[45] Date of Patent: * May 24, 1994

[54] METHOD AND APPARATUS FOR SUMMING TEMPERATURE CHANGES TO DETECT INK FLOW

[75] Inventor: Izadpour Khormaee, West Linn, Oreg.

[73] Assignee: Hewlett-Packard Company, Palo Alto, Calif.

[ * ] Notice: The portion of the term of this patent subsequent to Apr. 27, 2010 has been disclaimed.

[21] Appl. No.: 318

[22] Filed: Jan. 4, 1993

Related U.S. Application Data

[63] Continuation-in-part of Ser. No. 784,185, Oct. 29, 1991, Pat. No. 5,206,668.

[51] Int. Cl.[5] ........ G01D 9/00; G01D 15/18

[52] U.S. Cl. ........ 346/1.1; 346/140 R

[58] Field of Search ........ 346/1.1, 140 R, 75, 346/76 PH

[56] References Cited

U.S. PATENT DOCUMENTS

| | | | |
|---|---|---|---|
| 4,326,199 | 4/1982 | Tarpley et al. | 340/622 |
| 4,853,718 | 8/1989 | ElHatem et al. | 346/140 R |
| 4,910,528 | 3/1990 | Firl et al. | 346/1.1 |
| 4,935,751 | 6/1990 | Hamlin | 346/140 R |
| 4,940,997 | 7/1990 | Hamlin | 346/140 R |
| 4,973,993 | 11/1990 | Allen | 346/140 R |
| 5,206,668 | 4/1993 | Lo et al. | 346/140 R |

FOREIGN PATENT DOCUMENTS

| | | |
|---|---|---|
| 0353925 | 2/1990 | European Pat. Off. . |
| 0155960 | 9/1983 | Japan . |
| 0098542 | 9/1986 | Japan . |
| 0206657 | 9/1986 | Japan . |
| 0290064 | 12/1986 | Japan . |
| 0039261 | 2/1987 | Japan . |

*Primary Examiner*—Benjamin R. Fuller
*Assistant Examiner*—Eric Frahm

[57] ABSTRACT

A method and apparatus for detecting ink flow through the printhead of an inkjet pen includes sensing the temperature of the printhead substrate as the inkjet pen prints a test pattern into the printer spittoon. The method includes printing a test pattern and storing data representing the temperature of the printhead. The method includes summing the change in temperature of the printhead between an initial point and points at intervals during the printing of a test pattern to provide a thermal history of the printhead. Ink flow is determined from the rate of temperature change during the printing of a test pattern, and from the change in thermal history of the printhead among test patterns.

20 Claims, 5 Drawing Sheets

METHOD AND APPARATUS FOR SUMMING TEMPERATURE CHANGES TO DETECT INK FLOW

RELATED APPLICATION DATA

The present application is a continuation-in-part of application Ser. No. 07/784,185, filed Oct. 29, 1991, now U.S. Pat. No. 5,206,668.

BACKGROUND OF THE INVENTION

This invention relates to thermal inkjet printing and, more particularly, to detecting ink flow through the printhead of a thermal printing device such as a computer printer, facsimile machine or the like.

Thermal inkjet printing is now a common method of producing high quality, low cost printing with computer printers, facsimile machines and potentially with copiers and other devices as well. The basic design and operation of inkjet printing devices are well known and amply described in U.S. Pat. No. 4,910,528, owned by the present assignee and hereby incorporated by reference. Such devices use an inkjet pen (also known as an ink cartridge), which includes an ink container and printhead through which ink from the container is ejected onto the print media.

One concern with inkjet printing is the sufficiency of ink flow to the paper or other print media. Print quality is a function of, among other things, ink flow through the printhead. Too little ink on the paper produces faded and hard-to-read printed documents. In a worst case, no ink may be printed and the entire document is lost. This scenario may occur where a facsimile machine, out of ink, receives a transmission when unattended and attempts to print. Since the inkjet pen moves across the media even when no ink is being ejected, the facsimile machine mistakenly assumes that the transmission has successfully been received and acknowledges reception to the sender.

One approach to detecting the sufficiency of ink mechanically in inkjet printing is described in U.S. Pat. No. 4,935,751, also assigned to the present assignee. The ink pen therein houses a contractible ink bag to which is attached a rigid strip. The top end of the pen housing is a window revealing the end of the strip. A scale may be attached to the window. As the ink bag depletes, it contracts and pulls the strip across the window. An observer can manually tell from the position of the strip the relative amount of ink that is left in the bag and thereby the sufficiency of ink for printing. Another mechanical technique using a ball check valve is disclosed in U.S. Pat. No. 4,940,997.

A second approach is to place a capacitive sensor on the printhead, as disclosed in U.S. Pat. No. 4,853,718. The capacitance is a function of the amount of ink present in a channel connecting the ink reservoir to the inkjet of the printhead. With ink present, a charge on the capacitor leaks off quickly. With ink absent, the charge leaks off slowly. A sampling circuit designed to measure the capacitor voltage at a certain interval detects whether there is ink in the channel. Although plausible, this approach requires the addition of relatively complex and costly circuitry to the printing device.

A third approach is to place a thermistor (a semiconductor device whose electrical resistance is dependent upon temperature) directly in the ink channel. Ink has a greater thermal conductivity than air, and the resistance of the thermistor rises as air replaces ink in the channel. The drawback of this approach is that, over time, deposits form on the thermistor which cause it to give an erroneous output. A similar technique wherein a temperature sensor is surrounded by gas or liquid is described in U.S. Pat. No. 4,326,199.

A fourth approach, shown and described in U.S. Pat. No. 5,206,668, is to compare the temperature change of the printhead at two different printing intervals to determine inkflow through the printhead. As the printhead runs out of ink, its rate of temperature change increases. By examining the ever-increasing ratio of temperature change at distinct printing intervals, this approach determines when ink flow is no longer sufficient. While accurate, this approach may occasionally provide an out-of-ink signal too late because of an anomalous reading of temperature change at one of the intervals.

SUMMARY OF THE INVENTION

An object of the invention, therefor, is to provide a reliable method of detecting ink flow through a thermal inkjet printhead which overcomes the drawbacks of the prior art.

Another object of the invention is to provide such a method that relies on the history as well as the ratio of thermal change of the printhead to indicate ink flow.

Yet another object of the invention is to implement such a method using a minimum of low cost, additional components to the printing device.

To achieve these objects, a method and apparatus for detecting ink flow in accordance with the invention is described. The method includes sensing the temperature of the printhead as the printhead prints and summing temperatures of the printhead during the printing of a set of dots. The method further includes comparing the sum with a predetermined value to determine whether the ink flow through the printhead is sufficient for printing.

The apparatus includes a temperature sensor such as a thermal sense resistor and detection circuitry in communication with the sensor. The detection circuitry sums the temperature of the printhead during printing of a set of dots. The detection circuitry determines ink flow by comparing the sum with a predetermined value. In both the apparatus and method, the predetermined value may be a first sum from the printing of a first set of dots such that ink flow is determined by comparing two sums.

To provide more accurate detection of ink flow, the apparatus may also include detection circuitry for calculating first and second temperature changes of the printhead, and based on comparing the first and second temperature changes, determining the ink flow through the printhead. The apparatus, thus, provides a highly accurate system for determining whether ink flow is sufficient for printing.

The foregoing and other objects, features, and advantages of the invention will become more apparent from the following detailed description of a preferred embodiment which proceeds with reference to the accompanying drawings.

DESCRIPTION OF A PREFERRED EMBODIMENT

Figure 1:
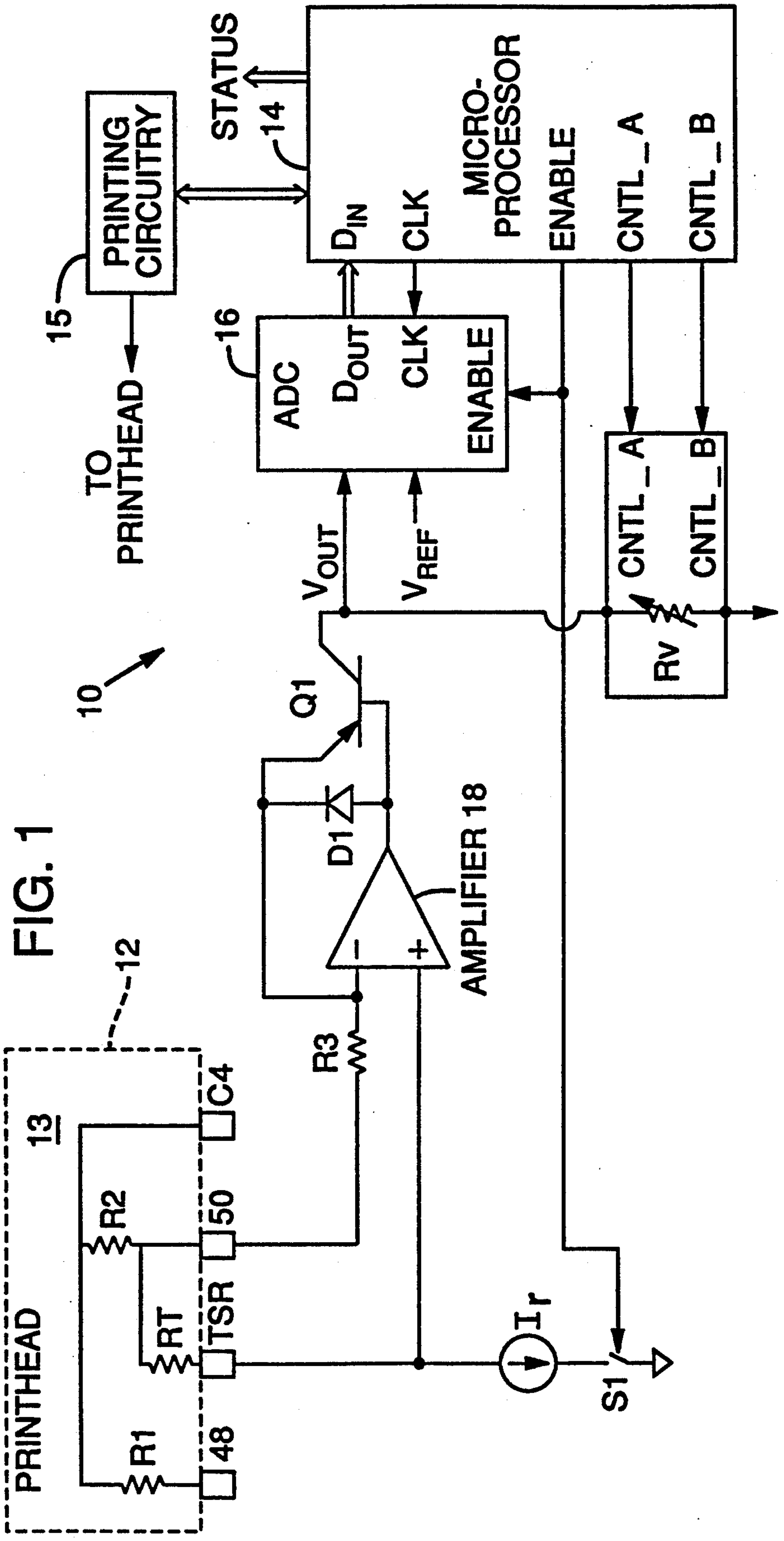
FIG. 1 is a schematic diagram of an apparatus according to the invention.

Referring to FIG. 1, there is shown a schematic diagram of an apparatus according to the invention in the form of a circuit 10. The circuit is preferably mounted within the printing device it controls. At the left of the figure is a portion of a thermal inkjet printhead 12 of conventional design such as of the type shown and described in U.S. Pat. No. 4,910,528, including heater resistors such as R1, R2 and a thermal sense resistor RT. RT is a temperature sensor whose resistance increases with temperature. In the present embodiment it is deposited on the printhead substrate 13 as a thin film resistor along with the heater resistors using a conventional process. The substrate, which is normally silicon, has a high thermal conductivity and will heat up as the heater resistors are pulsed to eject ink drops through the nozzles of the printhead. The substrate, in turn, heats up the thermal sense resistor RT, thereby increasing its resistance.

The rate of temperature rise of the substrate toward an equilibrium value depends, among other things, upon the volume of ink being ejected from the nozzles during printing. The rate increases as the volume of ink drops ejected during printing decrease. The reason for this phenomena is that the liquid ink leaving the printhead removes heat from the printhead. As the amount of liquid ink being ejected decreases, the amount of heat energy being removed decreases. The heat formerly removed by the ink flow is instead absorbed by the printhead substrate 13, which causes the substrate's temperature to rise at a faster rate than it otherwise would.

The circuit 10 uses this phenomena to detect the sufficiency of ink flow through the thermal inkjet printhead 12. The sensor RT senses the temperature of the printhead 12 as it prints. Detector circuitry within the circuit then compares a first change in temperature of the printhead at one point in printing with a second change in the temperature of the printhead at another point of printing. Based on that comparison, the detector circuitry determines the sufficiency of the ink flow through the printhead.

The possible designs for the detector circuitry are many, and may vary from a hardware approach using just analog circuits and logic gates to an equivalent software approach using solely a data processor. The present design is preferred because of it reliability, low cost and ability to tolerate thermal sense resistors having a wide variation in resistance.

The detector circuitry within circuit 10 includes a number of elements including a data processor such as a microprocessor 14. Microprocessor 14 is also used for control of the printing through conventional printing circuitry 15 that pulses the heater resistors such as R1 and R2. Connected to a data port of the microprocessor 14 is an analog-to-digital converter (ADC) 16 which converts an analog signal proportional to the resistance of RT into a digital signal that may be evaluated by the processor. Also connected to the processor 14 and responsive to its control is a variable resistor Rv. Resistor Rv is part of a gain circuit which also includes an operational amplifier 18, a resistor R3 connected between the inverting input of the amplifier and heater resistor R2, and a transistor Q1 connected to the output of the amplifier. Thermal sense resistor RT is connected to the noninverting input of the amplifier 18 and also to a current source $I_r$ controlled by a switch S1. Current source $I_r$ produces a voltage across RT which is used to measure its resistance. Switch S1 is responsive to an enable signal from processor 14. When S1 is closed, the detector circuitry operates to measure and compare temperature changes of the printhead in a manner to be described.

With this detection circuitry, a gain-adjusted voltage $V_{out}$ proportional to the thermally-induced resistance of RT is produced according to the following equation:

$$V_{OUT}=RT*I_r*(Rv/R3) \quad (1)$$

$D_{OUT}$, an 8-bit digital equivalent of $V_{OUT}$, is produced by the ADC 16 in response to enable signals from the processor 14. The value of $D_{OUT}$ can range from 0 to 255 and is directly proportional to the resistance of RT.

The gain circuit comprising amplifier 18, resistors R3 and Rv, and transistor Q1 is incorporated into the detector circuitry so that the resistance of RT need not be finely controlled during manufacture. Variations in its resistance can be compensated for by changing the value of variable resistor Rv in a manner to be described. Table I below illustrates that the resistances for Rv depend on the output sent by the data processor 14 from pins CNTL—A and CNTL—B to Rv:

TABLE I

| | CNTL_A | CNTL_B | RV RESISTANCE |
|---|---|---|---|
| Range 0 | Low | Low | 12.1 kΩ |
| Range 1 | Low | High | 7.2 kΩ |
| Range 2 | High | Low | 4.3 kΩ |
| Range 3 | High | High | 3.5 kΩ |

The resolution provided by $D_{OUT}$ is greatest when the range of resistance for RT is smallest across the 256 values. Table II illustrates that the higher the gain provided by RT, the better the resolution and thus the accuracy of the measurement of the temperature changes in the printhead substrate 13:

TABLE II

| | Range of RT | |
|---|---|---|
| With R3 = 1 kΩ; $V_{REF}$ = 2.5 V | Lower Limit, $D_{OUT}$ = 0 | Upper Limit $D_{OUT}$ = 255 |
| Range 0 | 10.33Ω | 20,62Ω |
| Range 1 | 17.36Ω | 34.65Ω |
| Range 2 | 29.07 | 58.03Ω |
| Range 3 | 35.71 | 71.29Ω |

Figure 2:
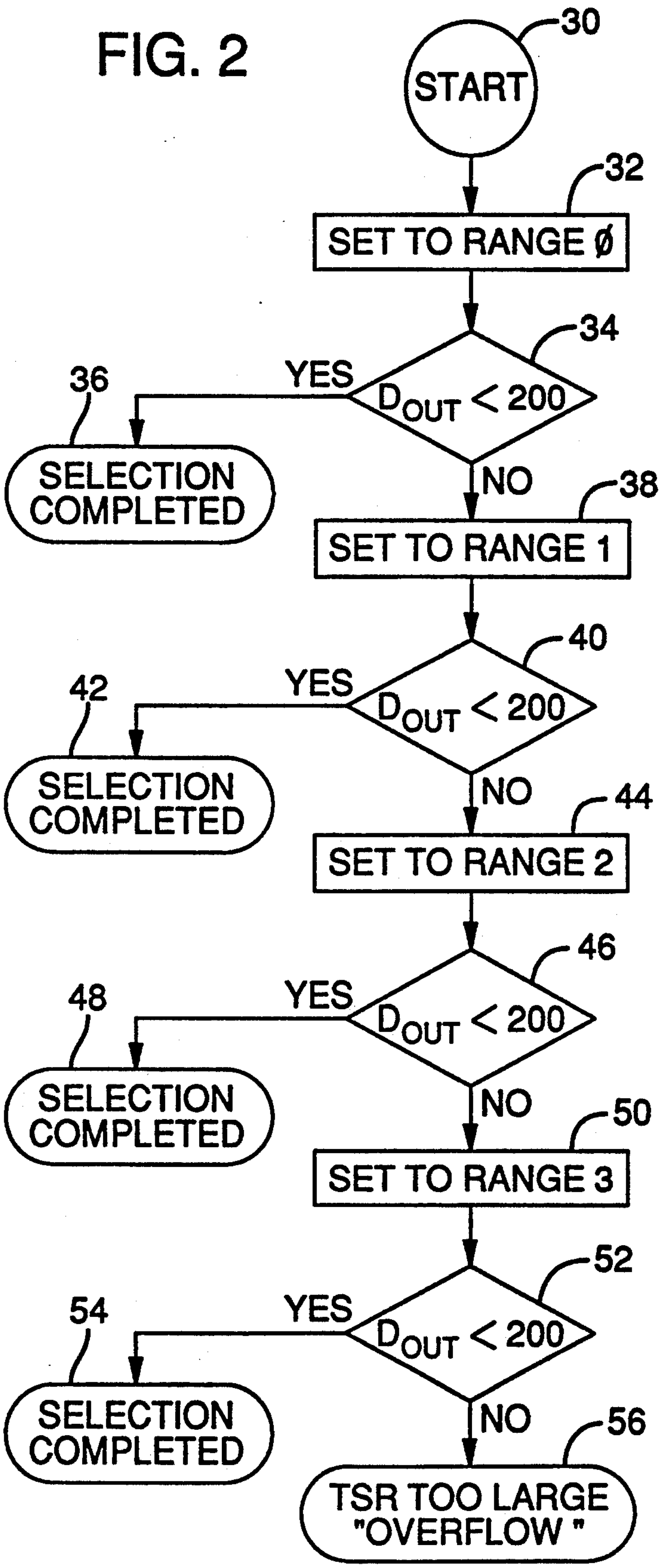
FIG. 2 is a flowchart illustrating a method of auto selecting a gain to be applied to the resistance of a thermal sense resistor before determining ink flow.

FIG. 2 illustrates a method programmed into the processor 14 for setting the gain of $V_{OUT}$ to select the greatest resolution of $D_{OUT}$ for a given range of resistance of RT, while insuring $D_{OUT}$ does not overflow its eight-bit count. Each decrease in gain increases the resistance range of RT and thereby reduces the digital resolution of the resistance. It is known from study and design of RT that $D_{OUT}$ will increase a maximum of 55 counts as the resistance of RT varies from a cold state to its warmest state. To accommodate this potential rise, the gain is selected so that the 'cold' resistance of RT as represented by $D_{OUT}$ is less than 200. For clarity, each step of the method shown in FIG. 2 and subsequent flowcharts and described herein will be noted with a reference numeral in parentheses.

The method of adjusting the resistance of Rv starts each time the printing device containing the inkjet pen is powered up or each time the pen is replaced (30). This is preferred because a new pen will likely have a thermal sense resistor RT with different resistive characteristics than the RT in the replaced pen. The processor 14 initially sets the variable resistance to range 0, the highest gain, to seek the best possible resolution (32). It then checks the output of ADC 16 to determine if it is less than 200 (34). The printhead at this point is cool since the pen has been idle and thus the resistance measured is the lowest resistance of RT. If the output of $D_{OUT}$ is less than 200, then range 0 provides a sufficient range of digital values and the selection of Vr is complete (36). However, if $D_{OUT}$ is equal to or greater than 200, then the gain for $V_{OUT}$ must be adjusted downward by setting Vr to the next lowest range 1 (38). Again $D_{OUT}$ is checked (40) and if it is now less than 200 the selection process is complete (42). If not, the selection process continues by setting the range to range 2 (44), checking $D_{OUT}$ (46) and completing the selection if appropriate (48). If $D_{OUT}$ is at least 200, Vr is set to the lowest range, range 3 (50), and $D_{OUT}$ is checked a last time (52). If $D_{OUT}$ is now less than 200, the selection process is complete (54). If not, the resistance of RT is simply too large to provide a usable range of values (56).

In most cases, the overflow result cannot occur because the process for making RT is sufficiently stringent to produce a resistance within a set range. If it does occur, the printing device will not operate and preferably will indicate the nature of the malfunction to the operator. This may be done by the microprocessor 14 alerting a display device via signals on a status line (FIG. 1).

Figure 3:
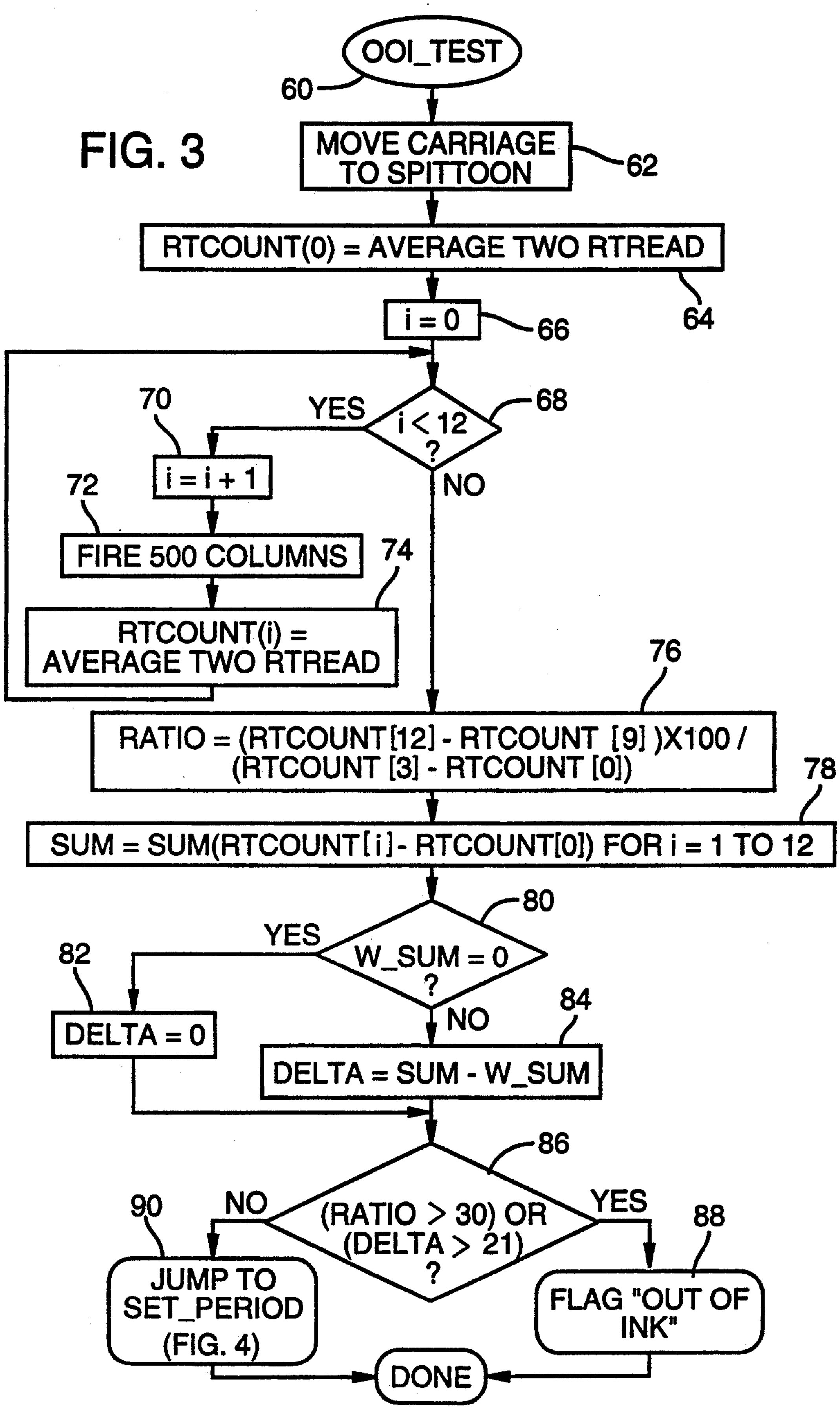
FIG. 3 is a flowchart illustrating a method of detecting ink flow through the printhead of the printing device.

With the value of Rv set, the processor 14 tests for ink flow when (1) the printing device is powered up, or (2) after a sheet of paper is ejected and the number of dots printed since the last test exceeds a threshold number. FIG. 3 is a flowchart illustrating the out-of-ink test. The test starts (60) by moving the pen carriage to the printer spittoon, where the printer ejects ink during the printing of a test pattern (62).

While the described embodiment includes the printing of a test pattern, it should be understood that one could implement the invention by generally printing sets of dots and sensing printhead temperature while the printhead prints. In this embodiment, printing a test pattern is merely one example of printing a set of dots to generate thermal data of the printhead as the printhead prints.

Before printing a test pattern, however, the processor 14 takes an initial reading of printhead temperature from RT through $D_{OUT}$ and stores the count. Throughout FIG. 3, the printhead temperature is represented by the variable, RTCOUNT, which represents the value of $D_{OUT}$ read by the processor. To minimize the effects of thermal noise (64) two successive readings are averaged. The initial averaged reading is used in ratio calculations and for normalizing a sum calculation, as will be described. Processor 14 then sets a count variable, i, to twelve (66) to record averaged temperature readings for twelve samples taken during printing of the test pattern. While the count variable exceeds zero (68), the method includes a loop for decrementing i (70), firing 500 columns of the test pattern (72), and recording averaged temperature readings of RT (74). This continues for twelve passes through the loop, until the printhead has printed a total of 6000 columns.

Having stored the temperature data for a test pattern, the data processor 14 calculates a ratio of temperature changes of the printhead from samples of the averaged counts of $D_{OUT}$ (76). The ratio may be determined by comparing the temperature change from printing the last 1500 columns to the temperature change from printing the first 1500 columns, as in FIG. 3, or by comparing other printing intervals as well. From the ratio, the method determines ink flow based on the principle that the temperature of the printhead rises as the quantity of ink flow through the printhead decreases.

The method continues with summing the temperature changes from the initial averaged reading for an entire test pattern (78) so that the sum may be compared with previous sums to determine ink flow. It should be understood that ink flow could be determined by comparing sums of temperature readings after printing sets of dots. This particular embodiment, however, sums the difference between an initial temperature reading before printing a set of dots in a test pattern and temperature readings taken after printing subsets of dots within the set of dots in a test pattern. The method and apparatus thus use an initial averaged reading taken at the beginning of the printing of a set of dots to normalize the sum calculation. Normalizing the sum calculation in this manner increases the resolution of the summing data used in the sum calculation to provide a more accurate result.

After calculating the sum, the processor 14 determines whether a weighted sum (w—sum) has already been calculated (not equal zero) (80). If w—sum does equal zero, the processor recognizes that the current ink test is an initial test. As a result, a variable delta (which represents the difference between sum and w—sum) is set to zero because no historical summing data exists (82). If w—sum does exist, then the processor calculates delta to determine the difference between the current sum of temperature changes and the previous weighted sum (84). In the discussion of the method of FIG. 4 to follow, the calculation of w—sum will be described in more detail.

While a preferred embodiment of the invention determines ink flow by comparing first and second sums, it should be understood that ink flow can be determined from a single sum. If the pen can be constructed such that the pen has very consistent thermal characteristics when full, then the ink flow can be determined by comparing a sum with a predetermined value representing the pen's typical temperature sum when full. Most pens manufactured today have varying thermal characteristics. As such, in a system using a typical pen, it is preferred to compare two actual sums to determine ink flow. With the variance in pens, it is simply impractical to predetermine a sum value.

With values for both the delta and ratio variables determined, the method determines ink flow by comparing both delta and ratio to empirically determined constants that represent values at which insufficient ink flow to the printhead is likely (86). If either the ratio is greater than 30 or delta is greater than 21, then the printhead has insufficient ink flow, and the operator is notified or equivalent action is taken to stop the printing device (88). If both variables, however, are less than the predetermined constants, ink flow is deemed sufficient and the processor instead performs the method illustrated in FIG. 4 to set the printing period for the next ink detection (90). The printing period represents a number of dots printed. The processor 14 checks after each page is ejected from the printing device whether the number of dots printed since the last test exceeds this printing period.

Figure 4:
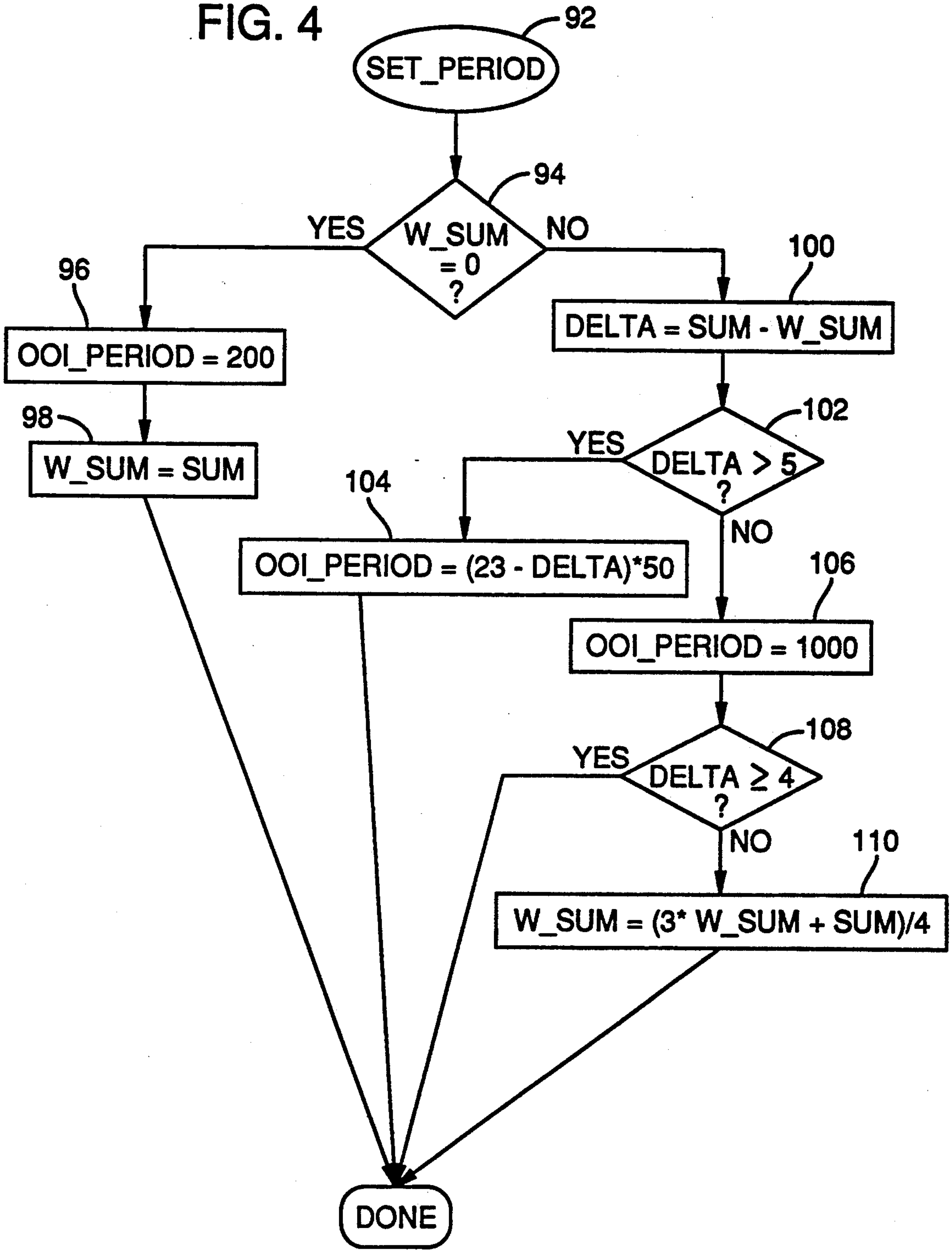
FIG. 4 is a flowchart illustrating a method of deciding when to perform the method of FIG. 3.

FIG. 4 illustrates a method of determining the printing period. The printing interval between ink tests is measured in a number of dots printed by the printhead 13 in units of 10,000 dots. This number of dots, represented by the ooi—period variable, depends on the thermal history of the printhead. The processor 14 performs the ink flow test when the number of dots printed by the printhead exceeds the value of ooi—period and the printing device has ejected a current page.

To establish the value of ooi—period (92), the method includes the following steps. If w—sum is equal to zero (94), no previous summing data exists (as in the instance where the power has just been turned on). Because no previous data on the thermal history of the printhead exists, the test pattern should be performed relatively soon to determine the ink flow status. The ooi—period variable is thus set to only 200 (96). Next, w—sum is set to the sum obtained from the current test pattern so that it may establish the thermal history of the printhead for further tests (98).

When w—sum does not equal zero (94), the processor 14 sets ooi—period based on the value of the delta variable. Delta represents the difference between a sum of the current test and the value of w—sum (100). If delta is greater than 5, then the thermal profile of the printhead, represented by the sum of temperature changes of the printhead, is deemed to be changing rapidly (102). This rapid change indicates that the next test should be performed soon because ink flow is decreasing. As delta approaches an empirically determined value, 23, the processor is programmed to shorten the period between tests (104). If delta is less than 5, then ooi—period is set to 1000, which reflects a longer printing interval between tests (106). If delta equals 4 or 5, ooi—period is set to 1000 and w—sum is not changed (108). If delta is less than 4 then the printhead is operating at a steady state, i.e., the thermal profile of the printhead is relatively constant.

When the thermal profile is relatively constant, it is preferred to set w—sum to a weighted sum that reflects the steady state thermal profile of the printhead. To calculate this weighted sum, the previous value of w—sum is modified by averaging in the current sum value (110). Using this weighted sum approach enables the processor to determine more accurately when the rate of temperature change increases from a steady state.

Figure 5:
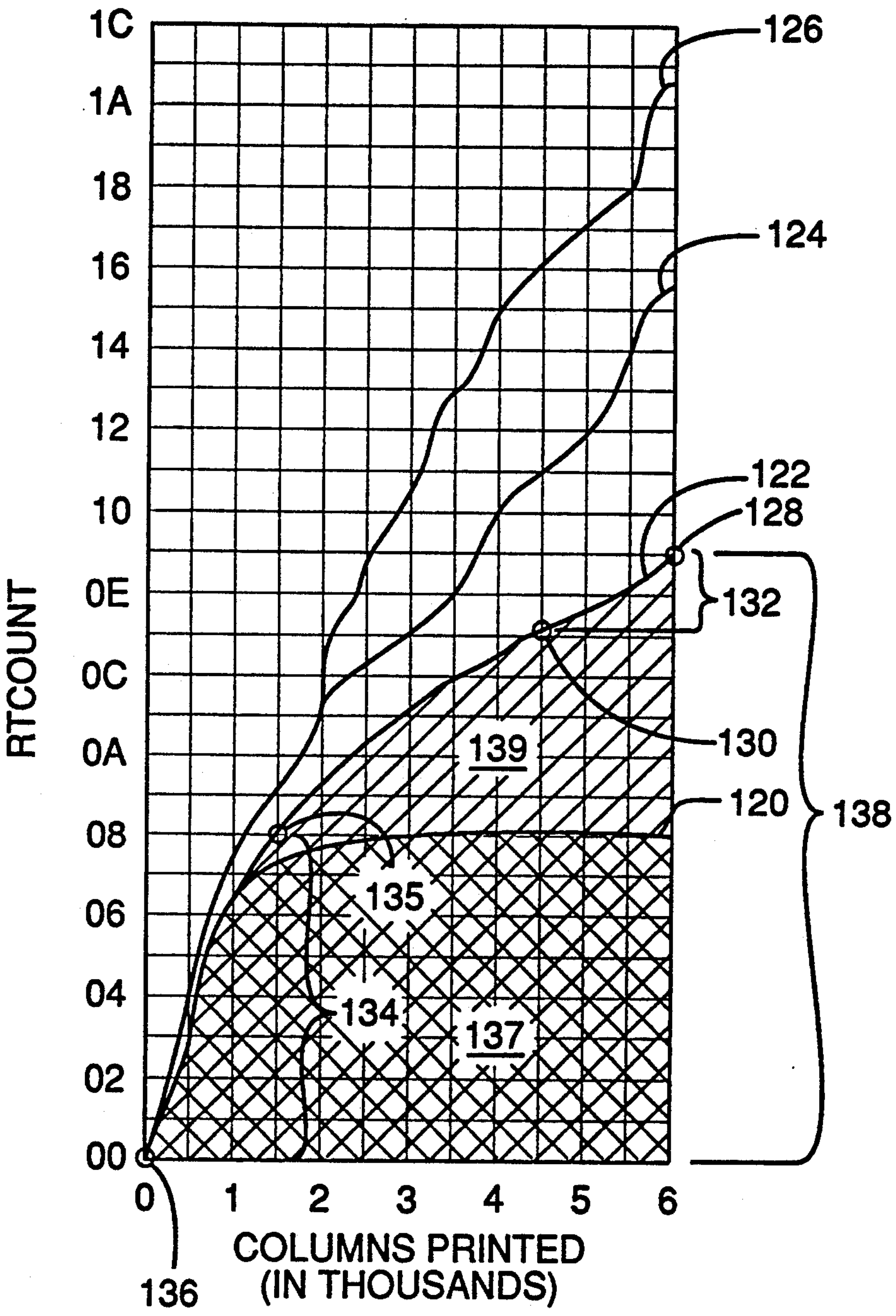
FIG. 5 is a graph of several curves illustrating the thermal profile of a printhead.

FIG. 5 is a graph of several curves illustrating the thermal profile of a printhead. The horizontal axis displays the number of columns printed during the printing of a test pattern. The vertical axis shows RTCOUNT, a hexadecimal number directly proportional to the resistance of RT. Since the value of RT directly relates to the temperature of the printhead, the vertical axis represents the temperature of the printhead. The graph shows a first curve 120, second curve 122, third curve 124, and fourth curve 126, each curve representing the variance of printhead temperature as a function of the number of dots printed. Specifically, the curves represent the typical thermal characteristics of the printhead 13 as it prints a set of dots, in particular, a test pattern. The first curve 120 shows the thermal characteristic of a printhead with a full pen, and the second through fourth curves 122-126 show the thermal characteristics of the pen at discrete stages as the pen runs out of ink.

From the temperature data shown in the curves, the processor is programmed to calculate the values of the sum and ratio variables. The processor receives a sample of the temperature at every 500 column interval and stores the data in memory. Each 500 column interval represents a subset of dots printed in a set of dots. To calculate the value sum, the processor 14 finds the temperature change between an initial point and at each 500 column interval. The processor then adds the sum of the temperature changes. To calculate the value of the ratio variable, the processor calculates, for example, the temperature change between first and second points 128, 130 and divides this difference 132 by the temperature change 134 at third and fourth points 135, 136. By employing both calculations, the processor may determine ink flow accurately while ignoring spurious noise effects and anomalous readings.

The difference in the first through fourth curves 120-126 illustrates the change in the thermal profile of the printhead as the printing device runs out of ink. The first curve 120 has very little slope, indicating that the pen is full of ink. The value of the ratio variable for the first curve 120 is zero. As the pen slowly runs out of ink, the temperature of the pen begins to rise faster with the number of dots printed in a test pattern. Reflecting the increasing rate of temperature change, the value of the ratio variable increases as the pen runs out of ink. The ratio values of the second through fourth curves increase, respectively. Similarly, by observing the difference in the sums of temperature readings, represented by the value of delta, one can determine ink flow through the printhead. As temperature of the printhead rises at an increasing rate, the area under successive curves increases. For example, the area 137 (crosshatched left) under the first curve 120 is the initial value of w—sum. After the number of dots in the printing period is exceeded, the area 138 under the second curve 122 is calculated as the current sum. The difference in areas between areas 137 and 138 is delta, represented by shaded area 139. If delta exceeds the value 21, then the pen is deemed out of ink (86, 88). As the pen runs out of ink, the area between the first curve 120 and the successive curves 124, 126 increases, eventually exceeding the threshold. This summing method increases the accuracy of the ink flow detector because it examines the thermal history of the pen, not just temperature changes at discrete points.

Having illustrated and described the principles of the invention in a preferred embodiment, it should be apparent to those skilled in the art that the invention can be modified in arrangement and detail without departing from such principles. For example, other threshold values may be chosen, and the method steps may be performed in various orders. We claim all such modifications and equivalents coming within the spirit and scope of the following claims, which are not intended to be limited to the exemplary embodiment described herein.

I claim:

1. An apparatus for detecting ink flow through a thermal inkjet printhead, comprising:

a temperature sensor for sensing a temperature of the printhead as the printhead prints; and detector circuitry in communication with the temperature sensor for:

summing the temperature of the printhead sensed a number of times during printing of a set of dots to provide a sum;

comparing the sum to a value; and based on such comparison determining inkflow through the printhead.

2. The apparatus of claim 1 including detector circuitry in communication with the temperature sensor for:

summing temperature of the printhead sensed a number of times during printing of a set of dots to provide a first sum wherein the first sum is the predetermined value and the sum is a second sum;

determining a difference between the first and second sums;

comparing the difference with a threshold value; and based on such comparison determining inkflow through the printhead.

3. The apparatus of claim 2 including detector circuitry for determining that a number of dots printed exceeds a number before again summing temperature of the printhead to provide the second sum.

4. The apparatus of claim 2 wherein summing temperature of a printhead includes summing the difference in the printhead temperature between an initial temperature value sensed before printing the set of dots and following temperature values sensed after printing each of a number of subsets of dots in the set of dots.

5. The apparatus of claim 2 wherein the detector circuitry is in communication with the temperature sensor for:

calculating a first change in printhead temperature from temperature values sensed by the temperature sensor;

calculating a second change in printhead temperature from temperature values sensed by the temperature sensor;

comparing the first change in temperature to the second change in temperature; and based on the comparison of the temperature changes, determining ink flow through the printhead.

6. The apparatus of claim 2 wherein the temperature of the printhead sensed during printing is averaged prior to summing.

7. The apparatus of claim 5 wherein the detector circuitry is constructed to select a resistance range for a thermal sense resistor for measuring changes in temperature of the printhead.

8. The apparatus of claim 1 wherein the detector circuitry comprises a data processor.

9. The apparatus of claim 1 including a thermal inkjet printer containing the printhead, temperature sensor and detection circuitry.

10. An apparatus for detecting ink flow through a thermal inkjet printhead, comprising:

a thermal sense resistor for sensing temperature of the printhead as the printhead prints and producing a resistance proportional to the temperature; and a data processor operably connected to the thermal sense resistor for:

calculating sums of temperatures of the printhead from temperature values sensed by the resistor; and determining from a change in the sums whether the ink flow through the printhead is sufficient for printing.

11. The apparatus of claim 10 including the data processor for:

calculating a change in printhead temperature from temperature values sensed by the resistor; and determining from the change in printhead temperature whether ink flow through the printhead is sufficient for printing.

12. The apparatus of claim 10 including a gain circuit operably coupled between the data processor and the thermal sense resistor for maximizing a resolution of signals representing the temperature of the printhead.

13. The apparatus of claim 11 wherein the data processor is programmed to cause the printhead to print test patterns for measuring the temperature, the test patterns providing a basis from which the data processor may interpret the ink flow.

14. The apparatus of claim 10 including an inkjet printer containing the thermal sense resistor and data processor.

15. A method of detecting ink flow through a thermal inkjet printhead, comprising the steps of:

sensing a temperature of the printhead as the printhead prints;

summing the temperature of the printhead during the printing of a set of dots to determine a sum;

comparing the sum with a value to determine whether the ink flow through the printhead is sufficient for printing.

16. The method of claim 15 wherein the summing step further includes:

summing the temperature of the printhead during the printing of a first set of dots to determine a first sum wherein the first sum is the value and the sum is a second sum;

and the comparing step includes:

comparing the first and second sums to determine whether the ink flow through the printhead is sufficient for printing.

17. The method of claim 16 wherein the summing step includes:

calculating changes in printhead temperature between a first temperature value sensed and temperature values sensed after printing subsets of dots in the first set of dots;

summing the changes in temperature of the printhead between the first temperature value sensed and temperature values sensed after printing subsets of dots in the first set of dots to provide a first sum of temperature changes;

calculating changes in printhead temperature between a first temperature value sensed and temperature values sensed after printing subsets of dots in a second set of dots; and summing the changes in temperature of the printhead between the first temperature value sensed and temperature values sensed after printing subsets of dots in the second set of dots to provide a second sum of temperature changes;

and the comparing step includes:

determining from the difference between the first and second sums whether ink flow through the printhead is sufficient for printing.

18. The method of claim 16 including varying a number of dots printed between the first and second set of dots based on the difference between the first and second sums.

19. The method of claim 15 further comprising:

calculating a first temperature change in the printhead resulting from printing a first subset of dots in a set of dots;

calculating a second temperature change in the printhead resulting from printing a second subset of dots in a set of dots;

comparing the first change in temperature to the second change in temperature; and based on the comparing of the first and second temperature changes, determining whether the ink flow is sufficient for printing.

20. The method of claim 19 including:

determining a least resistance of a thermal sense resistor, the least resistance of the resistor varying with temperature;

determining if a signal from the resistor representative of the temperature of the printhead has sufficient range for a temperature change comparison; and if not, adjusting gain of the resistor signal until the signal has sufficient range.

* * * * *